US012763309B2

United States Patent
Schopf et al.

(12) United States Patent
(10) Patent No.: US 12,763,309 B2
(45) Date of Patent: Oct. 13, 2026

(54) METHOD FOR MANUFACTURING DRY ELECTRODES ON A CURRENT COLLECTOR WITH THE AID OF A ROLLER SYSTEM, ROLLER SYSTEM, DRY ELECTRODE, COMPUTER PROGRAM PRODUCT, AND COMPUTER-READABLE MEDIUM

(71) Applicant: Volkswagen Aktiengesellschaft, Wolfsburg (DE)

(72) Inventors: Sven Schopf, Braunschweig (DE); Ludger Busswinkel, Braunschweig (DE); Sebastian Reuber, Dresden (DE); Roland Schmidt-Lobach, Hoersingen (DE)

(73) Assignee: PowerCo SE, Salzgitter (DE)

(*) Notice: Subject to any disclaimer, the term of this patent is extended or adjusted under 35 U.S.C. 154(b) by 0 days.

(21) Appl. No.: 18/622,168

(22) Filed: Mar. 29, 2024

(65) Prior Publication Data

US 2024/0332485 A1 Oct. 3, 2024

(30) Foreign Application Priority Data

Mar. 30, 2023 (DE) ..................... 10 2023 202 929.4

(51) Int. Cl.

| | |
|---|---|
| ***H01M 4/04*** | (2006.01) |
| ***B05C 1/08*** | (2006.01) |
| ***B05C 9/04*** | (2006.01) |

(52) U.S. Cl.

CPC ......... *H01M 4/0409* (2013.01); *B05C 1/0865* (2013.01); *B05C 1/0895* (2013.01); (Continued)

(58) Field of Classification Search

CPC ............. H01M 4/0409; H01M 4/0404; H01M 4/0435; H01M 4/139; H01M 4/02; (Continued)

(56) References Cited

U.S. PATENT DOCUMENTS

| | | | |
|---|---|---|---|
| 2015/0321504 | A1 | 11/2015 | Tang et al. |
| 2018/0221908 | A1 | 8/2018 | Enokihara et al. |

(Continued)

FOREIGN PATENT DOCUMENTS

| | | | |
|---|---|---|---|
| CN | 218101311 | U | 12/2022 |
| JP | 2016219343 | A | 12/2016 |

(Continued)

*Primary Examiner* — Gordon Baldwin
*Assistant Examiner* — Christina D Mcclure
(74) *Attorney, Agent, or Firm* — Muncy, Geissler, Olds & Lowe, P.C.

(57) ABSTRACT

A method is proposed for manufacturing dry electrodes on a current collector with the aid of a roller system. The roller system includes at least three rollers and the current collector. A first roller and a second roller are rotated in opposite rotational directions. Powder is poured into a calender gap formed by the first rotating roller and the second rotating roller, the powder being carried on the second roller. A signal is triggered with the aid of a control unit for setting a laminating gap between the second roller and the third roller, the third roller and/or the first roller and the second roller moving toward each other in the direction of the current collector. At least the third roller is rotated in the opposite direction of the second roller. The current collector is moved through the laminating gap.

6 Claims, 4 Drawing Sheets

Fig. 1

(52) U.S. Cl.
CPC ............. *B05C 9/04* (2013.01); *H01M 4/0404* (2013.01); *H01M 4/0435* (2013.01)

(58) Field of Classification Search
CPC ....... B05C 1/0865; B05C 1/0895; B05C 9/04; B30B 3/005; B30B 3/04; Y02E 60/10; Y02P 70/50
See application file for complete search history.

(56) References Cited

U.S. PATENT DOCUMENTS

| | | | | |
|---|---|---|---|---|
| 2020/0227722 | A1 | 7/2020 | Bogenstahl et al. | |
| 2021/0320288 | A1 | 10/2021 | Althues et al. | |
| 2022/0278307 | A1 | 9/2022 | Mimura et al. | |
| 2025/0108580 | A1 * | 4/2025 | Maeda | B30B 15/148 |

FOREIGN PATENT DOCUMENTS

| | | | |
|---|---|---|---|
| JP | 2017098176 | A | 6/2017 |
| JP | 2021159814 | A | 10/2021 |

* cited by examiner

METHOD FOR MANUFACTURING DRY ELECTRODES ON A CURRENT COLLECTOR WITH THE AID OF A ROLLER SYSTEM, ROLLER SYSTEM, DRY ELECTRODE, COMPUTER PROGRAM PRODUCT, AND COMPUTER-READABLE MEDIUM

This nonprovisional application claims priority under 35 U.S.C. § 119 (a) to German Patent Application No. 10 2023 202 929.4, which was filed in Germany on Mar. 30, 2023, and which is herein incorporated by reference.

BACKGROUND OF THE INVENTION

Field of the Invention

The invention generally relates to the field of electrode manufacturing and, in particular, to dry electrode manufacturing. Specifically, the invention relates to a method for manufacturing dry electrodes on a current collector with the aid of a roller system, a roller system, a dry electrode, a computer program product, and a computer-readable medium.

Description of the Background Art

During the manufacturing of dry electrodes using a multi-roller calender or using a roller system, a state arises when starting up the process, in which incomplete layers are situated on the rollers. If these incomplete layers are laminated to the current collector, a poor-quality electrode or even an unusable electrode is manufactured.

It is furthermore possible that the incomplete layers are not completely transferred to the current collector, and coating portions therefore remain on the rollers. When the material is again supplied to the film forming gap, it may clog the roller gap, so that the process must be stopped and, in the worst case, a damage of the rollers occurs.

SUMMARY OF THE INVENTION

It is therefore an object of the present invention to at least partially eliminate the disadvantages described above. In particular, the object of the present invention is to increase the efficiency and the reliability of a method for manufacturing dry electrodes and to lower the costs of manufacturing dry electrodes using a method of this type. The object of the present invention is also to increase the quality of dry electrodes manufactured using a method of this type.

The above object is achieved by a method for manufacturing dry electrodes on a current collector with the aid of a roller system, by a roller system, by a dry electrode, by a computer program product, and by a computer-readable medium. Features and details which are described in connection with the method according to the invention also apply, of course, in connection with the roller system according to the invention the dry electrode, the computer program product, and/or the computer-readable medium and vice versa in each case, so that reference always is or may be made interchangeably with respect to the disclosure of the individual aspects of the invention.

Thus, it is possible to advantageously provide an improved method for manufacturing dry electrodes on a current collector with the aid of a roller system according to the invention. With a method of this type, high-quality dry electrodes may be manufactured cost-efficiently and reliably.

An aspect of the present disclosure relates to a method for manufacturing dry electrodes on a current collector with the aid of a roller system. The roller system can include at least three rollers and the current collector arranged between a second roller of the at least three rollers and a third roller of the at least three rollers. The method includes the following steps: rotating a first roller of the at least three rollers and the second roller in opposite rotational directions; pouring powder into a calender gap formed by the first rotating roller and the second rotating roller, the powder being carried on the second roller; triggering a signal with the aid of a control unit for setting a laminating gap between the second roller and the third roller, the third roller and/or the first roller and the second roller moving toward each other in the direction of the current collector; rotating at least the third roller of the at least three rollers in the opposite direction of the second roller; and moving the current collector through the laminating gap.

The laminating gap is set in such a way that the powder is applied as a thin layer to the current collector for the purpose of forming the dry electrodes.

In other words, a method is proposed for manufacturing dry electrodes on a current collector with the aid of a roller system, which provides for first starting up the roller system before the powder is even applied as a thin layer to the current collector. A distinction may thus be made between two states or operating states. Before the signal for setting the laminating gap is triggered, the roller system may be operated in a starting mode or state. After the signal for setting the laminating gap is triggered, the roller system may be operated in a started mode or state.

The laminating gap may be a gap which is arranged between two rollers and through which the current collector may be arranged and preferable pass. In contrast to the laminating gap, the calender gap is a distance between two rollers, through which powder may be poured. Only one roller is generally situated between the laminating gap and the calender gap. In a subsequent compression process, two rollers may be provided between the laminating gap and the calender gap.

The powder may be a powdery material. The powder is preferably free of solvents and is transferred in layers with the aid of the roller system. The powder includes, in particular, an active material, a conducting additive, and a binder. The components of the powder may be mixed in advance of the method for manufacturing dry electrodes. The electrode may be referred to as a two-ply or one-ply layer applied to a substrate. The electrode may be, for example, a two-layer cathode material and/or a two-layer anode material.

The current collector may be referred to as a current collector or as a substrate. The current collector may have the primary function of being used as a substrate for the thin layer.

The quality of the manufactured electrodes may depend on the distribution of the powder or the powdery material as a thin layer. A high-quality electrode preferably arises from a uniform thin layer. It may therefore prove to be advantageous to apply the powder to the current collector only if the powder carried on the second roller forms a uniform thin layer.

For this purpose, the method provides to rotate the rollers which together form a calender gap. Powder which is supplied to or carried on the second roller has preferably already been poured into this calender gap. The powder may thus at least partially form a thin layer in the calender gap, due to a calender process. However, the powder generally first forms only an incomplete thin layer or a layer which may have defects. The powder, which may have become too thin, may have cracks, holes, or the like. An incomplete or defective layer of this type is therefore unusable for an electrode or would only result in a poor-quality electrode.

The method therefore provides to set the laminating gap only if a signal was triggered with the aid of a control unit. The triggering of the signal may be synonymous with a transition to a started state. The signal is preferably triggered when the powder now forms a uniform thin layer on the second roller. The signal is preferably triggered when the roller-supported layer(s) is or are fully present on the rollers.

Specifically, the control unit may trigger the signal at a command from a user. A user of the roller system may view the powder or the thin layer and decide accordingly that the laminating gap is now to be set in such a way that the powder may be applied as a thin layer to the current collector for the purpose of forming the dry electrodes.

The control unit may trigger the signal after a predefined number of rotations of the rollers, based on empirical values. Alternatively or additionally, a removal device, which is arranged, for example, on the second roller, may ascertain how much powder has been removed from the corresponding roller so that the control unit may trigger the signal based on the ascertained quantity of removed powder.

If the signal for setting the laminating gap has been triggered, the rollers of the roller system may be controlled by the control unit in such a way that the laminating gap is made smaller by the current collector. All rollers arranged on one side of the current collector may be moved synchronously toward the current collector in the radial direction. Alternatively, the rollers on the one side of the current collector as well as the rollers on the other side of the current collector may be moved radially in the direction of the current collector. If powder is applied as a thin layer to both sides of the current collector, it may prove to be advantageous to move the rollers from both sides of the current collector in the direction of the current collector. During the setting of the laminating gap, the distance between two adjacent rollers arranged around the current collector may be set and, in particular, shortened. It should be noted that the laminating gap does not have to be constant while operating the roller system.

The width of the laminating gap may furthermore be set by the control unit in the started state. The setting of the laminating gap may be force-controlled or position-controlled.

The laminating gap may vary during the application of the powder as a thin layer. The laminating gap may vary in that the powder may continue to be applied as a thin layer even during the variation. A force-controlled setting of the laminating gap takes into account the force or the pressure applied to the current collector during the application of the powder as a thin layer. If the force and/or the pressure on the current collector increase(s), the laminating gap is set wider. However, this means that the thin layer will also become thicker. During a force-controlled setting of the laminating gap, it may be provided to rework the electrodes thus manufactured to adapt the thickness of the electrodes.

During a position-controlled setting of the laminating gap, the actual distance between the current collector and adjacent roller or between the two adjacent rollers around the current collector is set. During a position-controlled setting of the laminating gap, the laminating gap may be constant throughout the started mode or state.

If the remaining rollers of the roller system are rotated, the laminating gap may be set in such a way that the powder may now be applied as a thin layer to the current collector. Alternatively, the remaining rollers of the roller system may be placed into motion simultaneously with the current collector. To a great extent, however, the remaining rollers may rotate or at least be freely rotatable only before the laminating gap is closed, since the sheet may otherwise tear. In an example, in which the thin layer is applied only to one side of the current collector the third roller is now placed into rotation. In an example of a roller system, symmetrical around the current collector, it may be conceivable that all rollers of the roller system are rotated even before the laminating gap is set. To a great extent, all rollers adjacent to a pouring device may be already rotated before the setting of the laminating gap.

The current collector may be moved or pass through the second and third roller immediately after the setting or the triggering of the signal for setting the laminating gap. Throughout the entire period, in which the laminating gap is too wide, the current collector and the current collector foil may be static in order to be able to apply the powder to the current collector at all. Energy may be saved thereby.

It should be noted that, if the roller system is designed to be symmetrical around the current collector, a two-sided dry electrode may be manufactured. As a result, powder may be poured into two calender gaps, and two layers may be correspondingly guided to each of the rollers adjacent to the current collector.

Due to the method, high-quality electrodes may be provided efficiently and precisely. A method of this type also makes it possible to avoid or at least reduce the clogging of the roller system. Due to a method of this type, the maintenance complexity of a roller system for manufacturing dry electrodes may be reduced.

The method can further include at least one of the following steps: ascertaining the thickness of the powder which has become a thin layer on the second roller; and triggering the signal with the aid of the control unit, based on the ascertained thickness.

To prevent the powder from being applied as an incomplete thin layer to the current collector, it may be provided that the thickness of the powder which has become a thin layer on the second roller, alternatively also on the third roller, is ascertained. This may be carried out with the aid of a layer thickness sensor. Alternatively or additionally, a camera may film the second roller, alternatively also the third roller, and display the photo on a user interface. Based on the photos of the second and/or third roller(s), a user may ascertain whether the thickness of the powder which has become a thin layer meets a predefined criterion, for example a predefined thickness. Alternatively or additionally, an artificial intelligence-based program may run over the photos recorded by a camera.

It should be noted that the layer is to have not only a predefined thickness but also an—at least predominately—constant thickness over a predefined section. In other words, a signal may be triggered with the aid of the control unit if the ascertained thickness meets a predefined criterion. The predefined criterion may be a coverage, a minimal defect-free surface, or the like.

The point in time of the triggering of the signal may be set more precisely thereby, whereby the quality of the manufactured electrode may be further increased.

The method can further include the following step: removing the powder carried on the second roller, in particular the powder which has become a defective thin layer, by means of a removal device, which is arranged downstream from the laminating gap in the rotational direction. The removed powder carried on the second roller may be a defective layer situated on the second roller, i.e., for example a layer having an incorrect thickness or irregular thickness. The removal of the powder carried on the second roller, which preferably has at least partially become a defective layer, may be carried out during the startup operation.

As a result, the material or the powder which is not applied to the current collector, whether in a starting or in an already started mode of the roller system, may be removed from the corresponding roller. This minimizes the risk of a clogging of the corresponding roller of the roller system.

The powder or the material which has been removed by the removal device may be resupplied to a pouring device. The powder may thus be reused, and the powder consumption during the manufacturing of electrodes may be reduced. Before the removed powder may be resupplied, it may prove to be advantageous to prepare the removed powder in a preceding process step.

The rotational speed of the first roller, the second roller, the third roller, and/or the pass-through speed of the current collector may be controlled with the aid of the control unit, preferably based on the ascertained thickness of the powder which has become a thin layer.

In other words, the roller system and, in particular, the rollers of the roller system may be controlled in such a way that a predefined criterion may be met, for example a coverage of the powder which has become a thin layer, a thickness of the thin layer, or the like. The thickness of the powder which has become a thin layer may depend on the rotational speed of the rollers of the roller system and vice versa.

Higher-quality electrodes may be manufactured thereby.

The powder can be collected and/or sucked off by the removal device during the removal of the powder carried on the second roller, in particular the powder which has become a defective thin layer.

The signal for setting a laminating gap between the second roller and the third roller can be triggered after a predetermined time.

The roller system may include, for example, a virtual twin. Based on simulations or trials using the virtual twin of the roller system, it may be known that the thickness, the coverage, and/or further parameters of the powder which has become a thin layer meet a predefined criterion after a predefined time. A predefined time of this type may be stored, for example, in a storage medium of the control unit. The signal for setting the laminating gap may therefore be triggered automatically after the predefined time.

The predefined time may also be based on empirical data and/or experience data. The predefined time may therefore be stored by a user in a storage medium of the control unit, for example with the aid of a user interface.

It may also be provided that the predefined time defines a maximum time. In other words, the signal may be triggered after a maximum time, for example independently of an ascertained thickness. This may prove to be advantageous, for example, if the control unit is configured to trigger the signal only in response to a command by the user. If the user forgets to issue the command, it is possible to avoid the roller system running for an unnecessarily long time in the starting mode or state.

It may also prove to be advantageous to trigger the signal after a predefined time if, for example, the layer thickness sensor malfunctions, and the signal may not be reliably triggered based on an ascertained thickness.

The method can further include at least one of the following steps: ascertaining a powder quantity which has been poured into the calender gap; and/or ascertaining a completed rotation of the second roller; and/or triggering the signal with the aid of the control unit, based on the ascertained powder quantity and/or the ascertained completed rotation of the second roller.

To be able to ascertain how much powder has been poured into the calender gap, it may be provided to ascertain the powder quantity removed from a dosing unit.

It should be noted that the very opposite may be done when stopping the roller system to avoid transferring unusable coating to the current collector. In other words, it may be provided that, when stopping the roller system, to first set the laminating gap in such a way that the powder may not be applied as a thin layer to the current collector. The corresponding rollers may be stopped only after the corresponding setting of the laminating gap, i.e., after enlarging the laminating gap.

A second aspect of the present disclosure relates to a roller system for manufacturing dry electrodes on a current collector. The roller system includes a control unit, at least three rollers, a current collector arranged in a laminating gap, which is designed to collect powder which has become a thin layer. The laminating gap defines the distance between a first roller of the at least three rollers and a second roller of the at least three rollers. The roller system further includes a pouring device, which is designed to pour powder into the calender gap. The calender gap defines the distance between a first roller and the second roller. The roller system also includes a removal device, which is configured to remove the powder carried on the second roller. The removal device is arranged downstream from the laminating gap in the rotational direction. The control unit is configured to trigger a signal for setting a laminating gap, in particular the thickness of the laminating gap.

The advantages which are explained above and below in reference to the method likewise apply to the roller system.

The roller system further can include a layer thickness sensor, which is configured to ascertain the thickness of the powder which has become a thin layer on the second roller, in particular upstream from the laminating gap in the rotational direction.

A third aspect of the present disclosure relates to a dry electrode, which is manufactured with the aid of a method as described above and below.

A fourth aspect of the present disclosure relates to a computer program product, comprising commands, which, when executed, prompt the control unit of the roller system, as described above and below, to carry out at least sub-steps of the method, as described above and below.

A fifth aspect of the present disclosure relates to a computer-readable medium, on which the computer program product, as described above, is stored.

All disclosures and advantages which are described above and below in reference to one aspect of the present disclosure likewise apply to all further aspects of the present disclosure.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
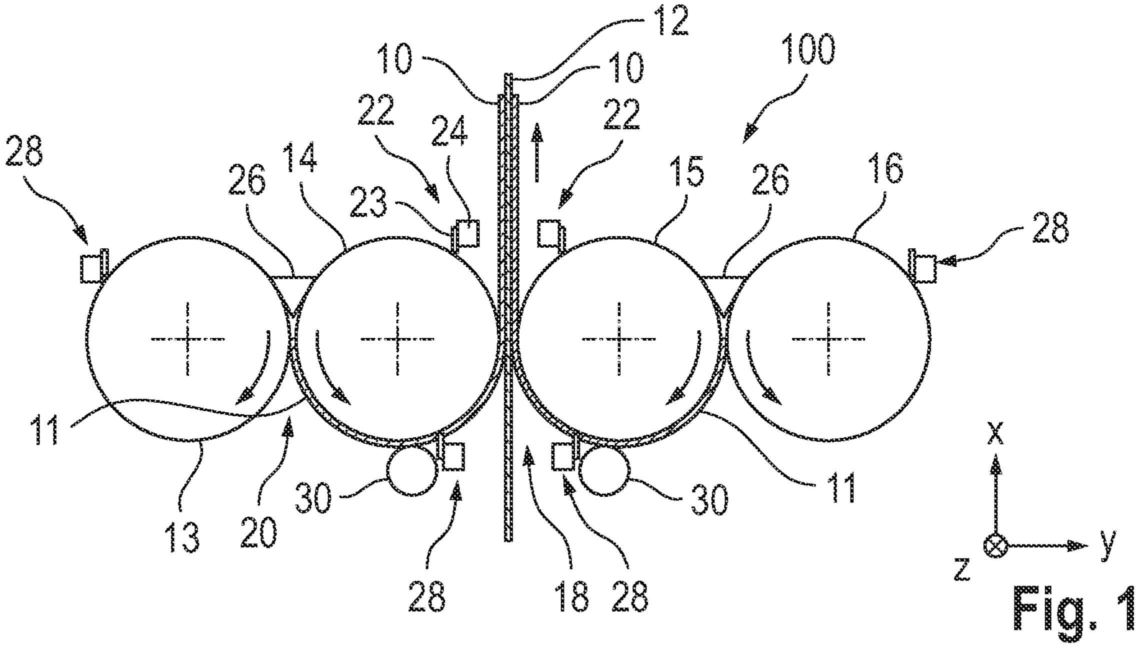
FIG. 1 schematically shows a side view of a roller system according to an example.

FIG. 1 schematically shows a side view of a roller system 100 according to an example. A roller system 100 of this type may be used to carry out a method for manufacturing dry electrodes 10 on a current collector 12. Roller system 100 in FIG. 1 includes four rollers. A gap is provided between first roller 13 and second roller 14, which is referred to as calender gap 20. First roller 13 may be referred to as an application roller. The gap between third roller 15 and fourth roller 16 is also referred to as calender gap 20. A contact pressure roller unit of this type may include one or more rollers. A gap is also provided between second roller 14 and third roller 15, which, however, is referred to as laminating gap 18. A current collector 12 is arranged in laminating gap 18. Second roller 14 and third roller 15 may be part of a contact pressure roller unit. Second roller 14 and third roller 15 may therefore be referred to as contact pressure rollers. Laminating gap 18, which may also be referred to as a contact pressure gap, may be designed to transfer powder 11 which has become a thin layer from a roller of the contact pressure roller unit, i.e., from second roller 14 and/or from third roller 15, to one side and possible to two sides of current collector 12 with the aid of a contact force. For the sake of completeness, it is noted that the rollers a provided with a cylindrical design and are preferably arranged in parallel to each other with regard to their axial axes.

Roller system 100 in FIG. 1 is essentially formed symmetrically around current collector 12. This means that powder 11 which has become the thin layer may be applied to both sides of current collector 12. It should be noted that elements and/or components described in reference to one side of current collector 12 of roller system 100 in FIG. 1 may also be situated mirror-symmetrically on the other side of current collector 12 of roller system 100 in FIG. 1. The efficiency of dry electrode 10 may be improved by the application of the thin layer to both sides of current collector 12. Manufactured dry electrode 10 is made up of the thin layer and current collector 12. One may speak of a one-sided dry electrode 10 or a two-sided dry electrode 10, depending on whether the thin layer is applied to both sides of current collector 12. Asymmetrical examples are also conceivable (cf. FIG. 7).

In roller system 100 in FIG. 1, two rollers, first roller 13 and second roller 14, are arranged on a first side of current collector 12 or on the left side of current collector 12. A pouring device 26, which is designed to pour powder 11, may be arranged at least partially in the two calender gaps 20 of roller system 100. Pouring device 26 may be referred to as a dosing unit. Removal devices 22 may also be provided on one of the two sides of current collector 12 in each case. The two rollers arranged the closest to current collector 12 may be provided with a removal device 22 of this type. Removal device 22 may include a scraper 23 and a collecting device 24.

First roller 13 and second roller 14 are configured to rotate in opposite rotational directions. Powder 11 may be poured into calender gap 20 between first roller 13 and second roller 14 with the aid of a pouring device 26. Powder 11 is then carried on second roller 14.

Roller system 100 in FIG. 1 is in operation, in particular, in started mode. This may be apparent from FIG. 1, since laminating gap 18 is set in such a way that powder 11 poured into particular calender gaps 20 becomes a thin layer and is applied as a thin layer to current collector 12 for the purpose of forming a dry electrode 10. This means that laminating gap 18 is small enough to permit powder 11 which has become a thin layer to be applied to current collector 12.

Figure 2:
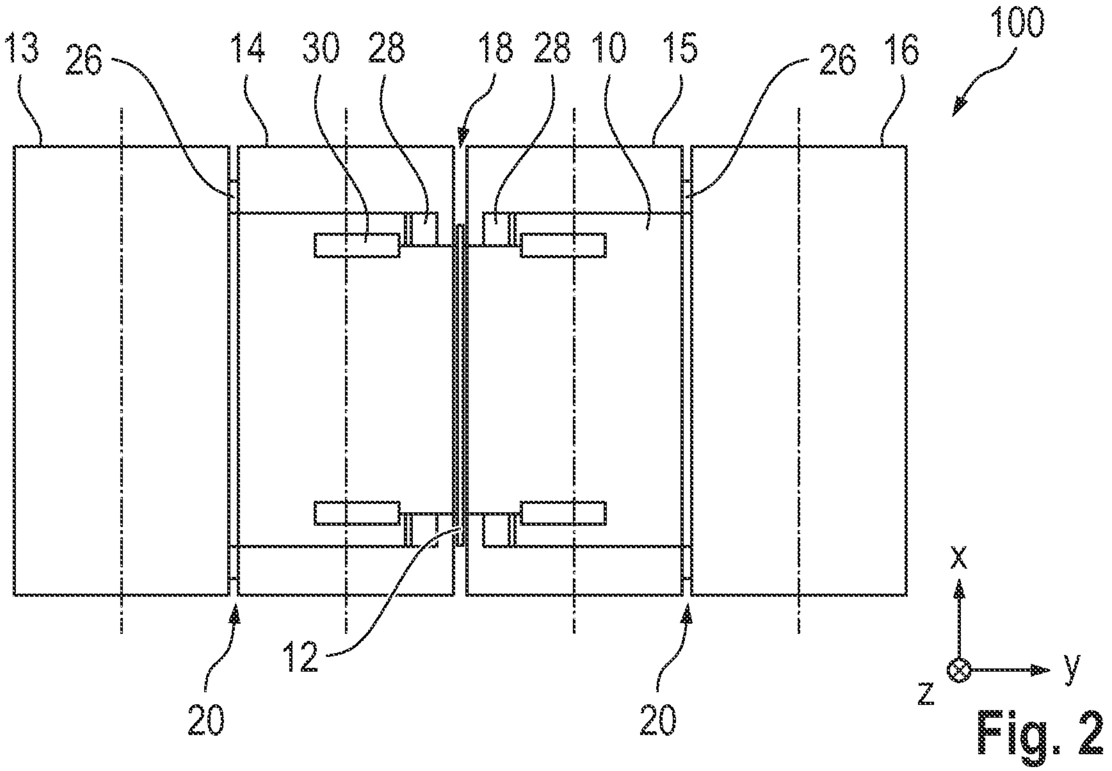
FIG. 2 schematically shows a top view of a roller system according to an example.

FIG. 2 schematically shows a top view of a roller system 100 according to an example. Roller system 100 in FIG. 2 may be, for example, roller system 100 in FIG. 1. Unless otherwise described, roller system 100 in FIG. 2 includes the same elements and features as roller system 100 in FIG. 1. The two thin layers, which are each applied to second roller 14 and to third roller 15, are then applied to current collector 12. To be able to set a predetermined width of dry electrode 10, at least one marginal edge section 30 is provided, preferably two marginal edge sections 30 for each roller. Marginal edge section 30 may precisely define or truncate the edge or margin of dry electrode 10. The width of electrode(s) 10 may be set with the aid of marginal edge section 30. A removal unit 28 is preferably arranged directly next to marginal edge section 30 to remove material or powder 11 extending beyond the edge or powder 11 which has become a layer. Removal unit 28 may remove or collect the material. Removal unit 28 may include a collecting container. In addition, removal unit 28 may include a scraper 23, with the aid of which the corresponding roller may be cleaned.

Powder 11 supplied to second roller 14 and to third roller 15 forms a thin layer. Once the thin layer has been applied to current collector 12, the thin layer may be referred to as dry electrode 10. To be able to manufacture a functioning dry electrode 10, the thin layer must be formed as homogeneously as possible. The thin layer must be formed free of defects or free of flaws. Cracks, holes, and/or fractures in the layer may be viewed, for example, as defects. The thin layer also preferably has a predefined minimum layer thickness. The thin layer or dry electrode 10 in FIG. 2 does not have any defects. It may be inferred therefrom that roller system 100 in FIG. 2 is also in operation, in particular, in started mode. After all, roller system 100 according to the invention is configured to be able to collect powder 11 which has become a thin layer with the aid of current collector 12 only in a started mode.

Figure 3:
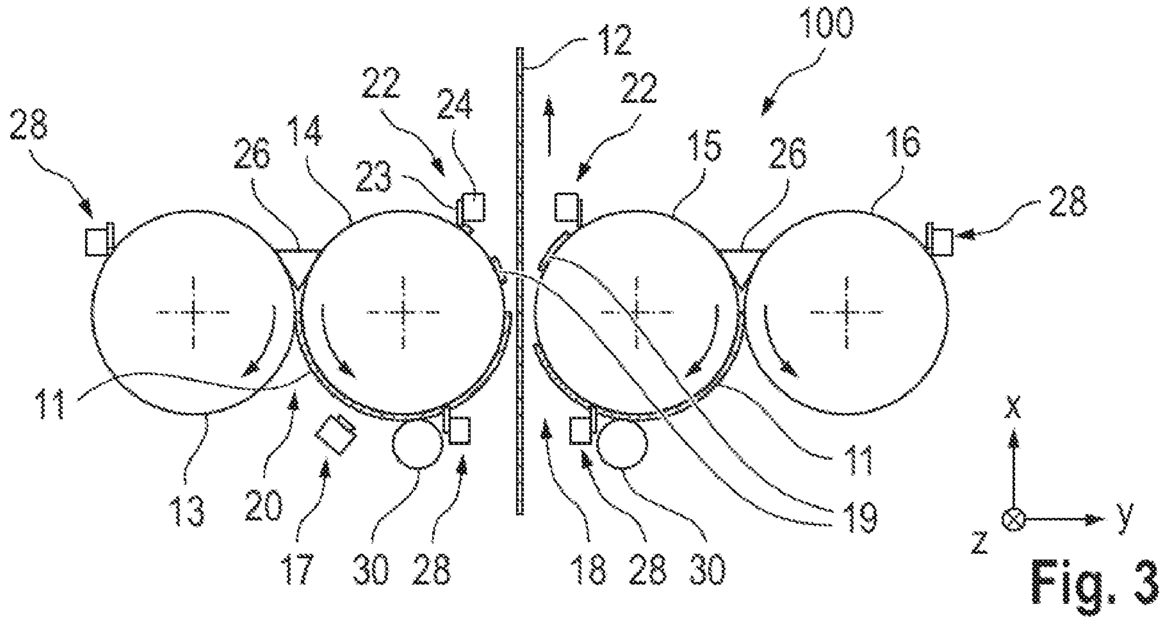
FIG. 3 schematically shows a side view of a roller system according to an example.

FIG. 3 schematically shows a side view of a roller system 100 according to an example. Unless otherwise described, roller system 100 in FIG. 3 includes the same elements and features as roller system 100 in FIGS. 1 and 2.

In contrast to roller systems 100 in FIGS. 1 and 2, roller system 100 in FIG. 3 is in a starting mode, i.e., not yet in the started mode. The gap, namely laminating gap 18, between second roller 14 and third roller 15 is larger in starting mode than in started mode. Laminating gap 18 of roller system 100 in FIG. 3 is set in such a way that powder 11 and/or powder 11 which has partially become a thin layer, may not be applied to current collector 12. In starting mode, it may therefore prove to be advantageous, for example to save energy, to not move current collector 12 through laminating gap 18.

Clumps 19 or particles of powder 11 are shown on second roller 14 and on third roller 15 of roller system 100 in FIG. 3. Clumps 19 may form a defective layer. Powder 11 poured into calender gap 20 has not yet become a thin layer in starting mode. Instead, the thin layer only just begins to form, which results in the creation of clumps 19 or particles of powder 11. Powder 11 has only partially become a thin layer in starting mode. In other words, the quality of the thin layer is not yet sufficient to turn it into a dry electrode 10. It is therefore advantageous to remove clumps 19 or particles of powder 11. This is implemented with the aid of a removal device 22. Removal device 22 may be configured to remove powder 11 on second and/or on third roller 15, preferably downstream from laminating gap 18 in the rotational direction. It may also be provided that removal device 22 cleans the corresponding roller during the removal of powder 11 or clumps 19. Removal device 22 may include a scraper 23 for this purpose. Removal device 22 preferably includes a collecting device 24 to remove the material, i.e. powder 11 and/or clumps 19, from the corresponding roller. Collecting device 24 may mechanically collect the material and/or suck off the material.

Roller system 100 in FIG. 3 also includes a layer thickness sensor 17. Layer thickness sensor 17 is preferably situated upstream from laminating gap 18 in the rotational direction. It is also conceivable that a further layer thickness sensor 17 is arranged on third roller 15 of roller system 100 in FIG. 3. After all, powder 11 which has become the thin layer is also carried on third roller 15.

The thickness of powder 11 which has at least partially become the thin layer may be ascertained or measured with the aid of layer thickness sensor 17. If the thickness of powder 11 and/or powder 11 which has at least partially become the thin layer is ascertained, it may be decided, or a control unit may decide, whether the ascertained thickness meets a predefined criterion. If the ascertained thickness meets the predefined criterion, the control unit may trigger a signal for setting laminating gap 18. During the setting of laminating gap 18, third roller 15, in particular together with fourth roller 16 and/or first roller 13 and second roller 14, may be moved toward each other in the direction of current collector 12.

Figure 4:
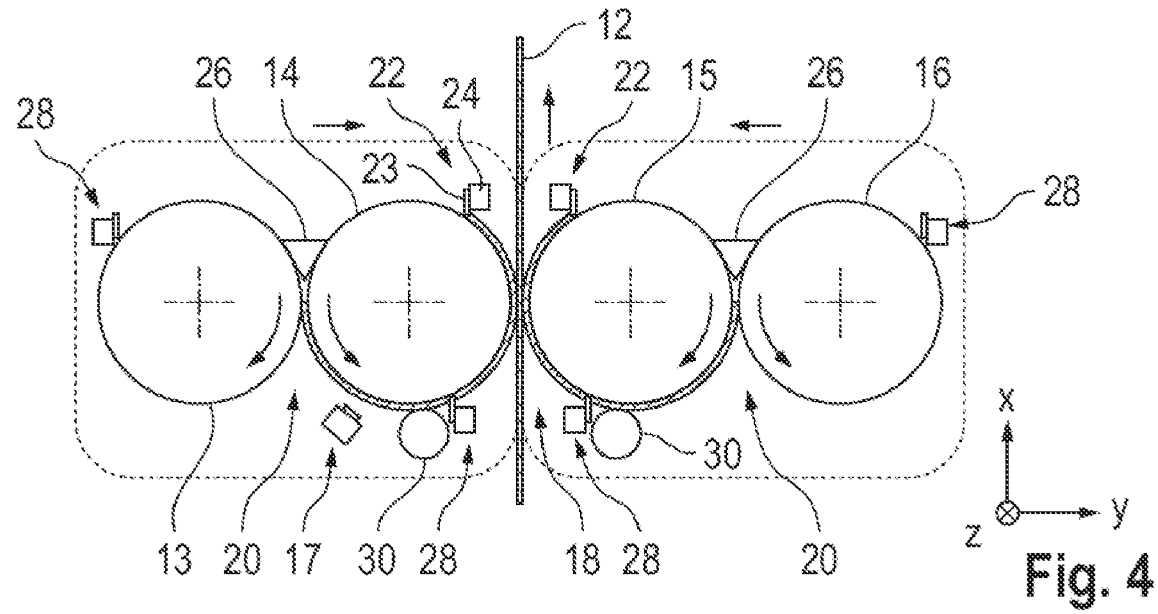
FIG. 4 schematically shows a side view of a roller system according to an example.

FIG. 4 schematically shows a side view of a roller system 100 according to an example. Unless otherwise described, roller system 100 in FIG. 4 includes the same elements and features as roller system 100 in FIGS. 1 through 3.

It is apparent in FIG. 4 that a dry electrode 10, or a thin layer, has not been applied to current collector 12. It may thus be recognized thereby that roller system 100 in FIG. 4 is still in starting mode. However, in contrast to FIG. 3, powder 11 carried on second roller 14 and on third roller 15 forms a homogeneous thin layer. In other words, roller system 100 was operated in starting mode long enough and thus ready to transition into started mode. The control unit of roller system 100 may therefore trigger a signal to set laminating gap 18 in such a way that powder 11 which has become the thin layer may now be applied to current collector 12. To set laminating gap 18, the rollers may be moved in pairs, i.e., first and second roller 14 together and/or third and fourth roller 16 together, toward current collector 12 in the radial direction. A movement of the rollers in pairs makes it possible to keep particular calender gap 20 constant. In an asymmetrical example of roller system 100, it is conceivable that, for example, only the two rollers on one side of current collector 12 are moved in the direction of current collector 12. The corresponding rollers are moved radially in the direction of current collector 12 until powder 11 which has become the thin layer may be applied to current collector 12. The radial movement or radial movements are illustrated with the aid of arrows in FIG. 4.

Figure 5:
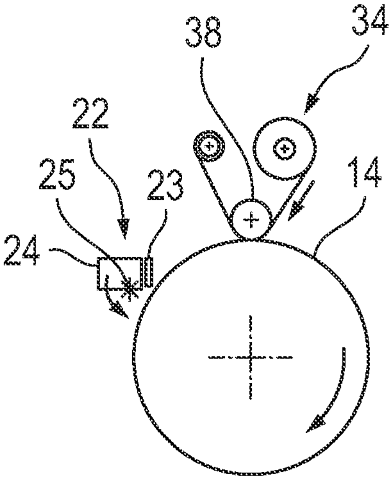
FIGS. 5 and 6 schematically show a roller of a roller system according an example.
Figure 6:
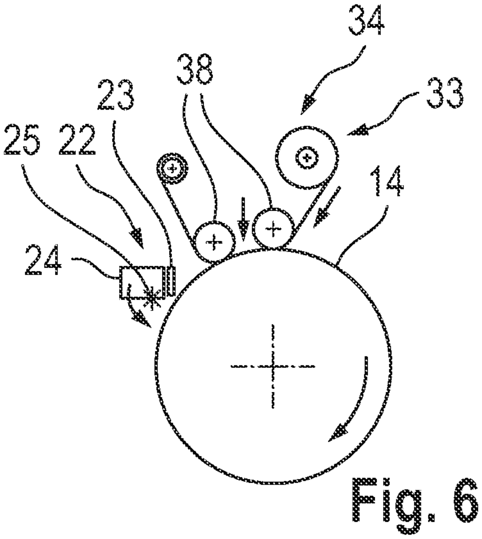

FIGS. 5 and 6 schematically show a roller of a roller system 100 according to an example. The rollers illustrated in FIGS. 5 and 6 may be third roller 15. If the rollers in FIGS. 5 and 6 are viewed in a mirror-inverted manner, they may also be second roller 14 of a roller system 100.

As described with reference to FIGS. 1 through 4, a removal device 22 may be arranged on second roller 14 and alternatively also on third roller 15. Removal device 22 may be used to remove material on the corresponding roller, on the one hand, and to clean the corresponding roller, on the other hand. Removal device 22 may include a brush 25 to clean the corresponding roller. Brush 25 may be a rotating brush. A cleaning device 34 may furthermore be provided downstream from removal device 22 in the rotational direction of the roller. Cleaning device 34 may clean the surface of the roller in addition to removal device 22. Cleaning device 34 may include one or multiple cleaning rollers 38, which are configured to apply a fibrous material or a non-woven fabric to the surface of the corresponding roller or to press it onto the rollers. A greater cleaning effect may be achieved thereby. The fibrous material may be wound off from one spool 33 to another spool 33 via cleaning roller 38 and be subsequently wound on again. In the example in FIG. 6, it may furthermore be provided that a cleaning agent is applied to the fibrous material and/or to the surface of the corresponding roller. In the example in FIG. 5, the cleaning of the roller may be carried out in a dry manner.

Figure 7:
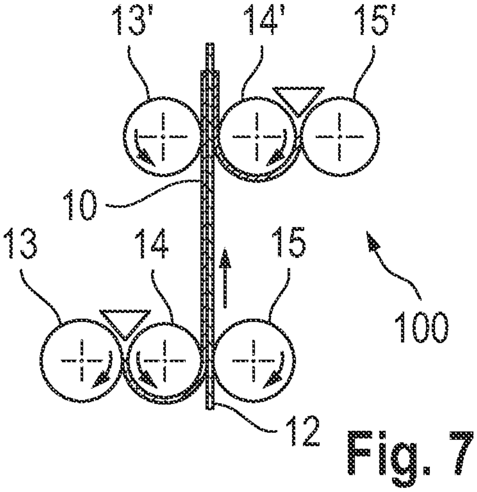
FIGS. 7 through 9 schematically show side views of roller systems according to examples.
Figure 8:
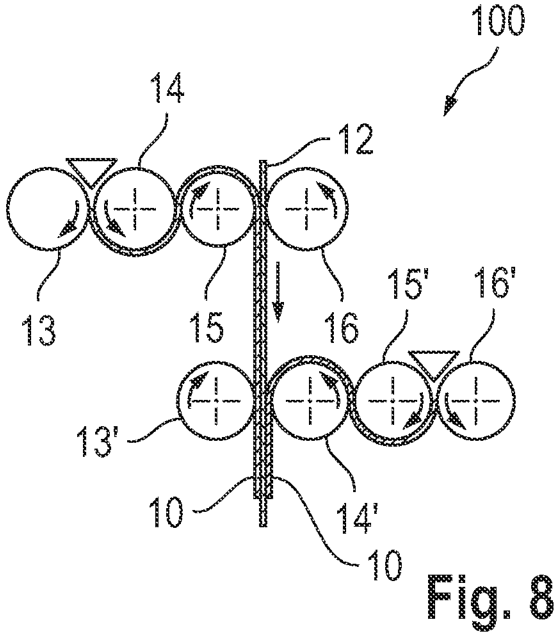
Figure 9:
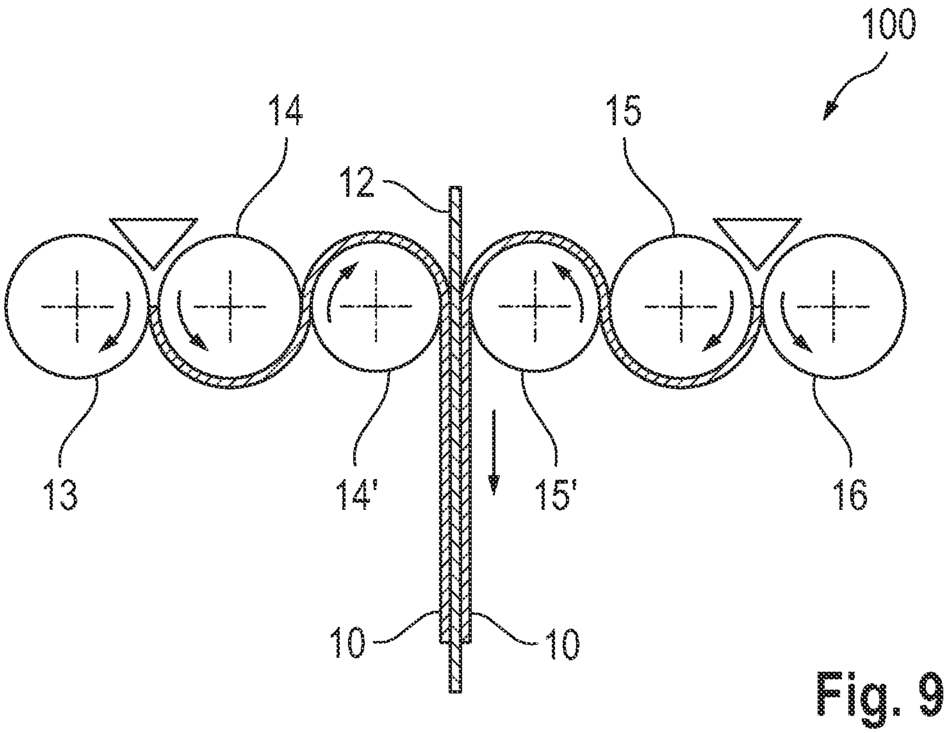

FIGS. 7 through 9 schematically show side views of roller systems 100 according to further examples. Unless otherwise described, roller system 100 in FIGS. 7 through 9 includes the same elements and features as roller system 100 in FIGS. 1 through 4.

In principle, any configuration of rollers 13, 14, 15, 16 and 13', 14', 15', 16' may be conceivable which makes it possible to apply a thin layer to one or to both sides of current collector 12. It is also conceivable to manufacture a dry electrode 10 which is only one-sided. In this case, roller system 100 may include only three rollers. For example, only the lower three rollers of roller system 100 in FIG. 7 may be provided. In FIG. 9, four rollers may also be provided for transferring the thin layer to current collector 12. In other words, it is conceivable that a contact pressure roller unit is provided, which includes for contact pressure rollers. Powder 11, which is pressed on evenly, is therefore carried on two second rollers 14, 14' and also on two third rollers 15, 15' in the example in FIG. 9.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for manufacturing dry electrodes on a current collector with the aid of a roller system, the roller system comprising at least three rollers, the current collector is arranged between a second roller of the at least three rollers and a third roller of the at least three rollers, the method comprising:

rotating a first roller of the at least three rollers and the second roller in opposite rotational directions;

pouring powder into a calender gap formed by the first roller and the second roller, the powder being carried on the second roller as a layer;

triggering a signal, via a control unit, for setting a laminating gap between the second roller and the third roller, in which the third roller and the second roller are moved towards each other in a direction of the current collector;

rotating the third roller in an opposite direction of the second roller; and moving the current collector through the laminating gap, the laminating gap being set such that the layer of the powder carried on the second roller is applied to the current collector for forming the dry electrodes, wherein prior to the triggering of the signal to set the laminating gap and prior to the layer of the powder carried on the second roller being applied to the current collector, a defective layer of the powder carried on the second roller is removed, via a removal device, the removal device being arranged downstream from the laminating gap in the rotational direction, and wherein, during the removal of the defective layer of the powder carried on the second roller, the laminating gap is larger than when the laminating gap is set such that the layer of the powder carried on the second roller is applied to the current collector, and wherein during the removal of the defective layer of the powder carried on the second roller, the current collector is not moved through the laminating gap.

2. The method according to claim 1, wherein the method further comprises: ascertaining a thickness of the layer of the powder carried on the second roller; and triggering the signal for setting the laminating gap, via the control unit, based on the ascertained thickness.

3. The method according to claim 2, wherein a rotational speed of the first roller, the second roller, the third roller, and/or a pass-through speed of the current collector is/are controlled by the control unit based on the ascertained thickness of the layer of the powder carried on the second roller.

4. The method according to claim 1, wherein the defective layer of the powder carried on the second roller is collected and/or sucked off by the removal device.

5. The method according to claim 1, wherein the signal for setting the laminating gap between the second roller and the third roller is triggered after a predetermined time.

6. The method according to claim 1, wherein the method further comprises: ascertaining a powder quantity which has been poured into the calender gap; ascertaining a completed rotation of the second roller; and/or triggering the signal for setting the laminating gap, via the control unit, based on the ascertained powder quantity and/or the ascertained completed rotation of the second roller.

* * * * *